United States Patent [19]
Chao et al.

[11] Patent Number: 5,204,882
[45] Date of Patent: Apr. 20, 1993

[54] SERVICE CLOCK RECOVERY FOR VARIABLE BIT RATE SERVICES

[75] Inventors: Hung-Hsiang J. Chao, Lincroft; Cesar A. Johnston, Berkeley Heights, both of N.J.

[73] Assignee: Bell Communications Research, Inc., Livingston, N.J.

[21] Appl. No.: 846,769

[22] Filed: Mar. 6, 1992

Related U.S. Application Data

[63] Continuation of Ser. No. 627,659, Dec. 14, 1990, abandoned.

[51] Int. Cl.⁵ .............................................. H04J 3/06
[52] U.S. Cl. .................................... 375/106; 375/120; 370/94.1; 370/94.2; 370/100.1
[58] Field of Search ....................... 375/118, 120, 106; 370/84, 91, 94.1, 94.2, 99, 108, 100.1, 48

[56] References Cited

U.S. PATENT DOCUMENTS

| | | | |
|---|---|---|---|
| 4,479,142 | 10/1984 | Buschman et al. | 370/99 |
| 4,569,062 | 2/1986 | Dellande et al. | 370/48 |
| 4,586,189 | 4/1986 | Tyrrel | 370/48 |
| 4,592,050 | 5/1986 | Bensadon | 375/118 |
| 4,819,226 | 4/1989 | Beckner et al. | 370/55 |
| 4,893,306 | 1/1990 | Chao et al. | 370/99 |
| 4,920,534 | 4/1990 | Adelmann et al. | 370/94.1 |
| 4,961,188 | 10/1990 | Lau | 370/94.2 |
| 5,007,070 | 4/1991 | Chao et al. | 375/118 |

OTHER PUBLICATIONS

"A Wide-Band Local Access System Using Emerging Technology Components", L. R. Linnel et al, IEEE J on Sel Areas in Comm, vol. 4, pp. 612-618, Jul. '86.
"Toward an International Broadband ISDN Standard", S. E. Minzer, Telecommunications, Oct. 1987.

Primary Examiner—Curtis Kuntz
Assistant Examiner—Young Tse
Attorney, Agent, or Firm—Leonard Charles Suchyta; Joseph Giordano

[57] ABSTRACT

To recover the service clock of a variable bit rate source (170) which generates data at a rate which is not proportional to a service clock (76), timing cells are generated. The timing cells are generated at a rate which is proportional to the service clock (76). The timing cells and data are transmitted via a network (100). At the receive-end, the data is stored in a buffer (82). A phase locked loop (90') generates a local clock signal in the form of a read signal which controls the rate at which the received data is read out of the buffer (82). The read signal produced by the phase locked loop (90') is proportional to the average rate at which timing cells are received at the receive-end. In this manner the signal which reads the data out of the buffer (82) at the receive-end approaches the service clock (76) at the source end.

16 Claims, 7 Drawing Sheets

SERVICE CLOCK RECOVERY FOR VARIABLE BIT RATE SERVICES

This application is a continuation of application Ser. No. 07/627,659, filed Dec. 14, 1990 abandoned.

An application entitled "Service Clock Recovery Circuit", filed on Oct. 31, 1989 for Hung-Hsiang Jonathan Chao and Cesar Augusto Johnston, bearing Ser. No. 07/429,840, and assigned to the assignee hereof, contains subject matter related to the subject matter of the present application. The aforementioned related application is incorporated herein by reference.

FIELD OF THE INVENTION

The present invention relates to a clock recovery scheme for a variable bit rate service. The present invention is especially useful for recovering the clock of a variable bit rate service whose data is transmitted in a network which uses the Asynchronous Transfer Mode.

BACKGROUND OF THE INVENTION

The demand for various broadband telecommunications services such as high resolution video, voice communications, and terminal and computer connections provides an impetus for the introduction of a broadband digital trunk and exchange network. One example of a broadband digital trunk and exchange network is known as the Broadband Integrated Digital Services Network (B-ISDN) (see, e.g., L. R. Linnel et al, "A Wide-Band Local Access System Using Emerging Technology Components", IEEE Journal on Selected Areas in Communications,"Vol. 4, No. 4, pp. 612-618, Jul. 1986).

Information transmitted across a broadband digital trunk and exchange network such as B-ISDN may be carried using the Asynchronous Transfer Mode (ATM) (see, e.g., S. E. Minzer, "Toward an International Broadband ISDN Standard," Telecommunications, Oct. 1987). In the ATM technique, data from various services are transmitted in fix length cells. These data cells are inserted into slots which form the payload envelopes of the frames of the Synchronous Optical Network (SONET) STS-3c or STS-12c signals (see, e.g., Draft of American National Standard for Telecommunications Digital Hierarchy Optical Interface Rates and Formats Specifications, T11.4/87-505R4, Dec. 1987). The technique is called the Asynchronous Transfer Mode because the individual slots of a frame are not synchronously reserved for specific services, but instead individual slots of a frame are occupied dynamically by the data cells of the specific services based on the availability of slots and the demand for transmission capacity by the specific services. In the trunk and exchange network, cells are switched from one bit stream to another so that particular cells can be routed to particular units of customer premises equipment.

A transmitting unit of customer premises equipment transmits data via an Asynchronous Transfer Mode bit stream of a trunk and exchange network by writing the data into an associated transmit-buffer. A cell assembler circuit reads the data from the transmit-buffer and formats the data into cells with cell headers. The cells are then inserted into the Asynchronous Transfer Mode bit stream.

A receiving unit of customer premises equipment receives data from an Asynchronous Transfer Mode bit stream through use of a cell disassembler circuit which extracts the payload envelopes from the frames of the Asynchronous Transfer Mode bit stream and filters out the cells containing data addressed to the receiving unit of customer premises equipment. Data addressed to the receiving unit of customer premises equipment is written into a receive-buffer. The data is then read from this receive-buffer and transferred to the receiving unit of customer premises equipment.

Correctly recovering the original service clock from the incoming data at the receive-end is a challenging task. U.S. Pat. No. 5,007,070 describes how the transmit service clock may be recovered at the receiver, when the transmitting unit of customer premises equipment has a fixed bit rate. In this case, the rate at which data from the transmitting unit of customer premises equipment is written into the transmit-buffer is directly proportional to the service clock. As indicated previously, the data in the transmit-buffer is transmitted through the broadband trunk and exchange network by being organized into cells which are embedded in the Asynchronous Transfer Mode bit stream. The individual data cells are transmitted through the trunk and exchange network in a non-uniform manner due to variable queuing delays.

At a receiving unit of customer premises equipment, the data is stored in a receive-buffer. A digital phase locked loop reads the data from the receive-buffer in a manner so as to recover the transmit-end service clock. Illustratively, the digital phase locked loop comprises a digital phase detector, a low pass filter and a voltage controlled oscillator whose center frequency is chosen to be as close as possible to the known nominal frequency of the service clock at the transmit-end. The output signal of the voltage controlled oscillator controls the rate at which information is read from the receive-buffer and transferred to the receiving unit of customer premises equipment.

Because the rate at which information is written into the transmit-buffer at the transmit-end is proportional to the service clock, the service clock can be recovered at the receive-end by averaging the rate at which information is transferred from the receive-buffer to the receiving unit of customer premises equipment. The rate at which information is transferred from the receive-buffer to the receiving customer premises equipment is averaged by the digital phase locked loop. In particular, the phase detector of the digital phase locked loop monitors the occupancy level of the receive-buffer and adjusts the output signal of the voltage controlled oscillator to maintain the occupancy of the receive-buffer within a certain range so as to average the rate at which data is transferred to the customer premises equipment.

In this manner, the signal which reads the data from the receive-buffer approaches the original service clock which writes the data into the transmit-buffer at the transmit-end, whereby the original service clock is recovered at the receive-end.

A problem arises when the above-described clock recovery scheme is applied to a transmit unit of customer premises equipment which has a variable bit rate. Such variable bit data sources make use of a service clock. However, the rate at which data comes out of the equipment and is stored in the transmit-buffer is not directly proportional to the service clock.

An example of a variable bit rate source is a variable bit rate video coder. Such a video coder makes use of a sampling clock of constant frequency but the rate at which information comes out of the coder is not directly proportional to this sampling clock. Rather, information coming out of a variable bit rate video coder is a function of picture variations. If there are no changes between two consecutive picture frames, then no information comes out of the coder. Thus, the signal to write valid data into the transmit-buffer is not a periodic signal. Instead, this signal is a function of picture variations which are random. Thus, the abovedescribed scheme for recovering the transmit service clock at a receiving unit of customer premises equipment is not applicable to this situation.

In view of the foregoing, it is an object of the present invention to provide a method and circuit for recovering the service clock of a variable bit rate source.

SUMMARY OF THE INVENTION

In accordance with an illustrative embodiment of the present invention, a variable bit rate transmitting unit of customer premises equipment, generates data at a rate which is not proportional to the service clock frequency. However, in addition to the data, timing cells are generated at a rate which is proportional to the service clock frequency of the variable bit rate source. Illustratively, the variable bit rate data is formatted into cells and both the data cells and timing cells are embedded in an Asynchronous Transfer Mode bit stream for transmission via a broadband trunk and exchange network to a receiving unit of customer premises equipment. At the receiving unit of customer premises equipment, the received data cells are disassembled and the data is stored in a receive-buffer. A phase-locked loop generates a local clock signal which controls the rate at which information is read out of the receive-buffer and transferred to the receiving unit of customer premises equipment. The output signal of the phase-locked loop is generated at a rate which is proportional to the average rate at which timing cells are received (not the average rate at which data is received) so as to recover the service clock.

Preferably, timing cells are given a higher priority than data cells when transmitted through the broadband trunk and exchange network.

In a particular embodiment of the invention, the timing cells are tagged with a number when they are generated at the transmit-end. These numbers can be used to correct for missing timing cells at the receive-end.

DETAILED DESCRIPTION OF THE INVENTION

Figure 1:
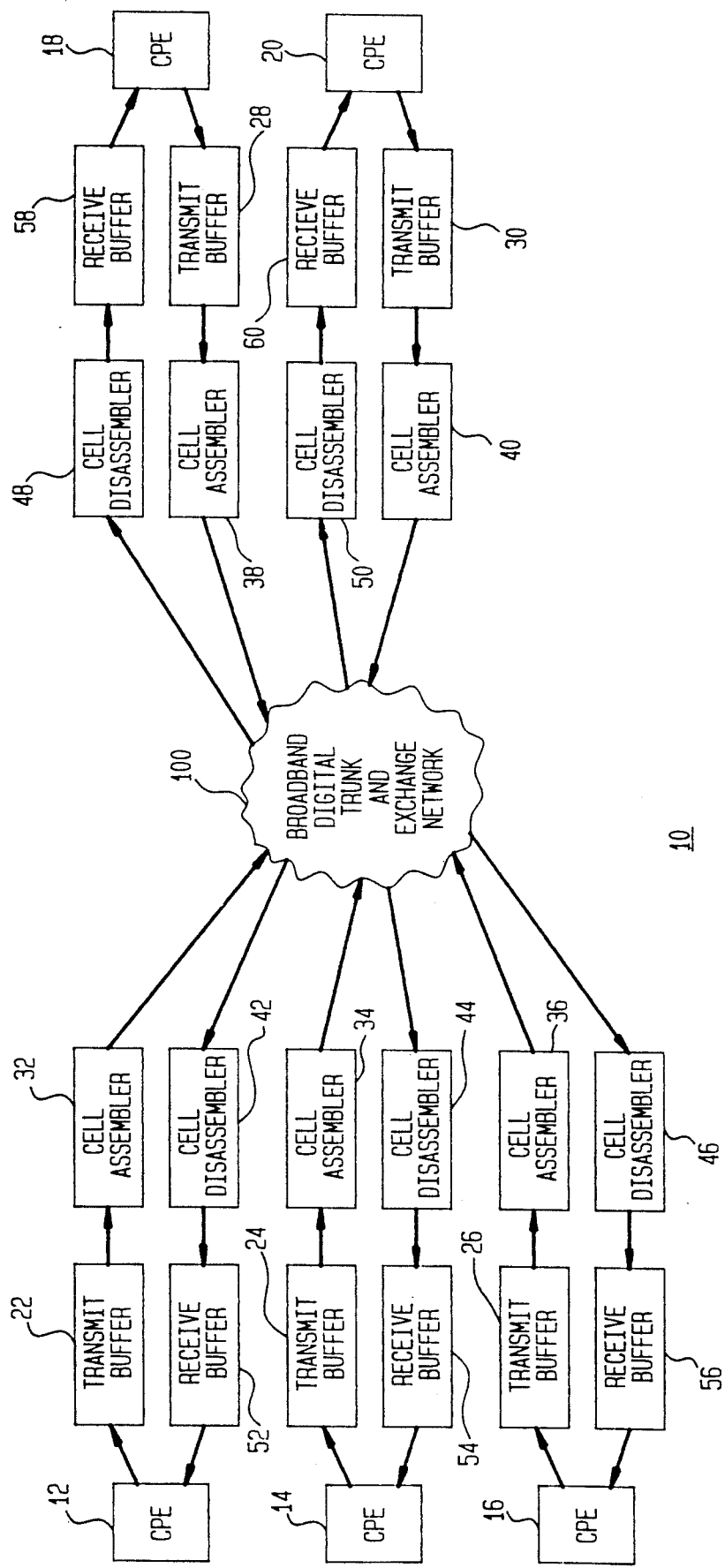
FIG. 1 schematically illustrates a broadband digital trunk and exchange network.

FIG. 1 schematically illustrates a broadband telecommunications network 10. The network 10 includes a plurality of units of customer premises equipment 12, 14, 16, 18, 20. The units of customer premises equipment may include telephones, telefaxes, high resolution video devices, and computer terminals and work stations. Associated with each unit of customer premises equipment 12, 14, 16, 18, 20, is a transmit-buffer 22, 24, 26, 28, 30, a cell assembler 32, 34, 36, 38, 40, a cell disassembler 42, 44, 46, 48, 50 and a receive-buffer 52, 54, 56, 58, 60. Each unit of customer premises equipment 12, 14, 16, 18, 20 transmits data to and receives data from other units of customer premises equipment via the broadband digital trunk and exchange network 100.

Figure 2:
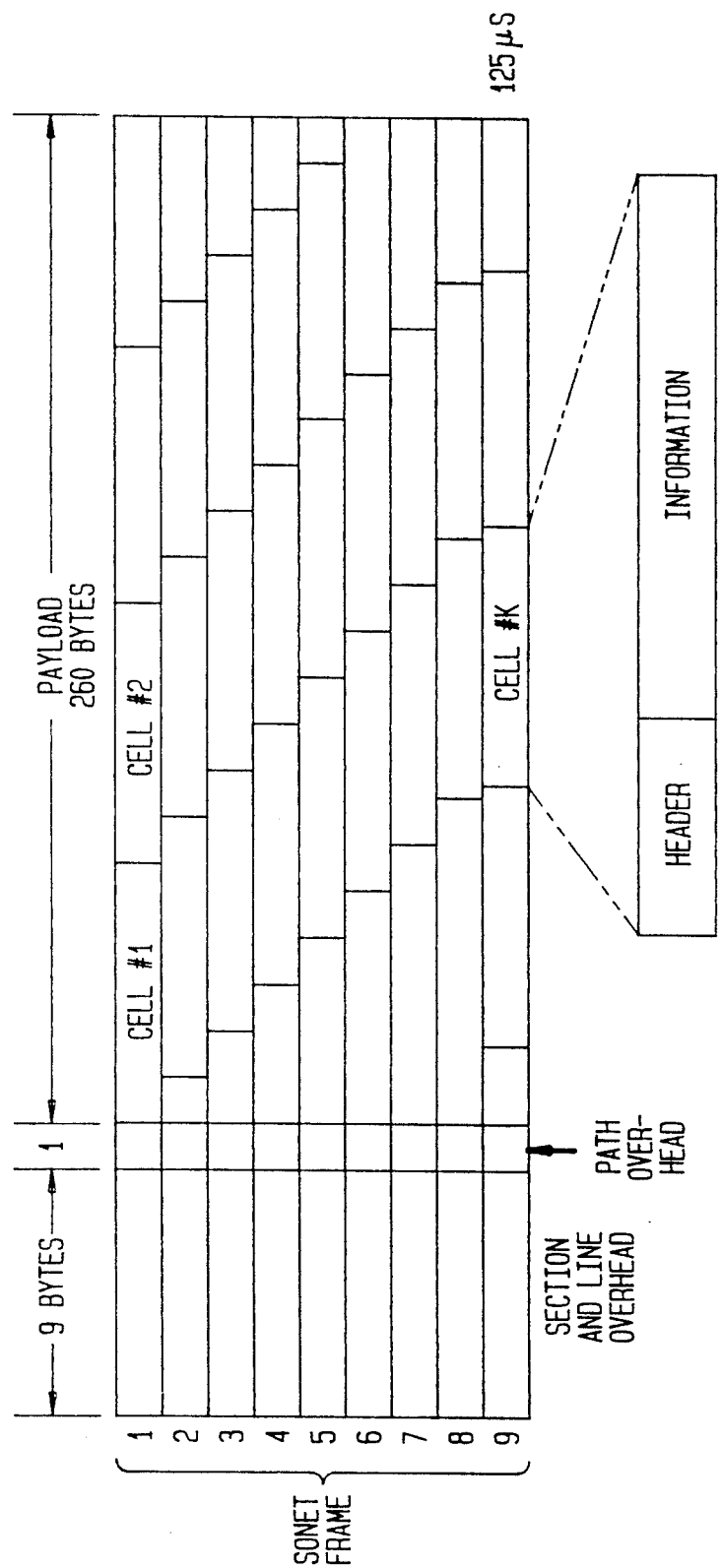
FIG. 2 schematically illustrates a SONET frame for use with the Asynchronous Transfer Mode.

The network 100 transmits data utilizing the Asynchronous Transfer Mode. In this case, the SONET STS-3c signal format may be utilized. The STS-3c signal is a 155.52 Megabits/sec signal which is organized into 125 μsec frames. One such SONET frame is illustrated in FIG. 2. In FIG. 2, the STS-3c frame is shown as being divided into nine blocks or lines, with the blocks being transmitted serially in the order shown. Each line includes part of the frame overhead and part of a payload envelope. In particular, each line includes nine section and line overhead bytes, one path overhead byte, and 260 payload bytes. The overhead bytes are used for operations, administration and maintenance, at the section, line and path layers, in a broadband digital trunk and exchange network such as the B-ISDN.

To use the STS-3c frame structure for the Asynchronous Transfer Mode transmission technique, the frame payload envelope is divided into slots which contain fixed size data units called cells. Illustratively, each SONET STS-3c frame contains about forty-four cells. Each cell contains a header field and an information field. The cell header contains routing information for the cell and the information field contains data to be delivered to a particular unit of customer premises equipment. The transmission technique is called the Asynchronous Transfer Mode because the individual slots of a frame are not synchronously reserved for the data cells of particular services, but instead individual slots are occupied dynamically by the cells of particular services based on the availability of slots and demand for transmission capacity by particular services. In the network 100 (see FIG. 1), switches (not shown) are provided for switching cells from one bit stream to another so that particular data can be routed to particular locations.

When the STS-3c signal is converted to optical form it is known as the OC-3 signal. For higher bit rate transmissions, four STS-3c signals may be interleaved in a trunk and exchange network to form a 622.08 Mbit/sec STS-12c signal. Other SONET formats such as STS-24, STS-36, and STS-48 may also be utilized in connection with the Asynchronous Transfer Mode to transmit data.

When the Asynchronous Transfer Mode is utilized, the network 100 may be used to transmit data from a variety of different sources such as voice and video.

Returning now to FIG. 1, for a unit of customer premises equipment such as the unit 12 to transmit data via the network 100, data from the unit of customer premises equipment is written into a transmit-buffer such as the buffer 22. The data in a transmit-buffer such as the buffer 22 is used to form cell information fields.

The cell assembler attaches a header to an information field to form a data cell and inserts the data cell into an available slot of the Asynchronous Transfer Mode bit stream.

For a unit of customer premises equipment such as the unit 18 to receive data via the network 100, the cells of an Asynchronous Transfer Mode bit stream are received by an associated cell disassembler such as the cell disassembler 48. The cell disassembler 48 filters out those cell having a header indicating that they are addressed to the customer premises equipment 18. The data from the selected cells are written into a receive-buffer 58 and transferred to the customer premises equipment 18.

Figure 3:
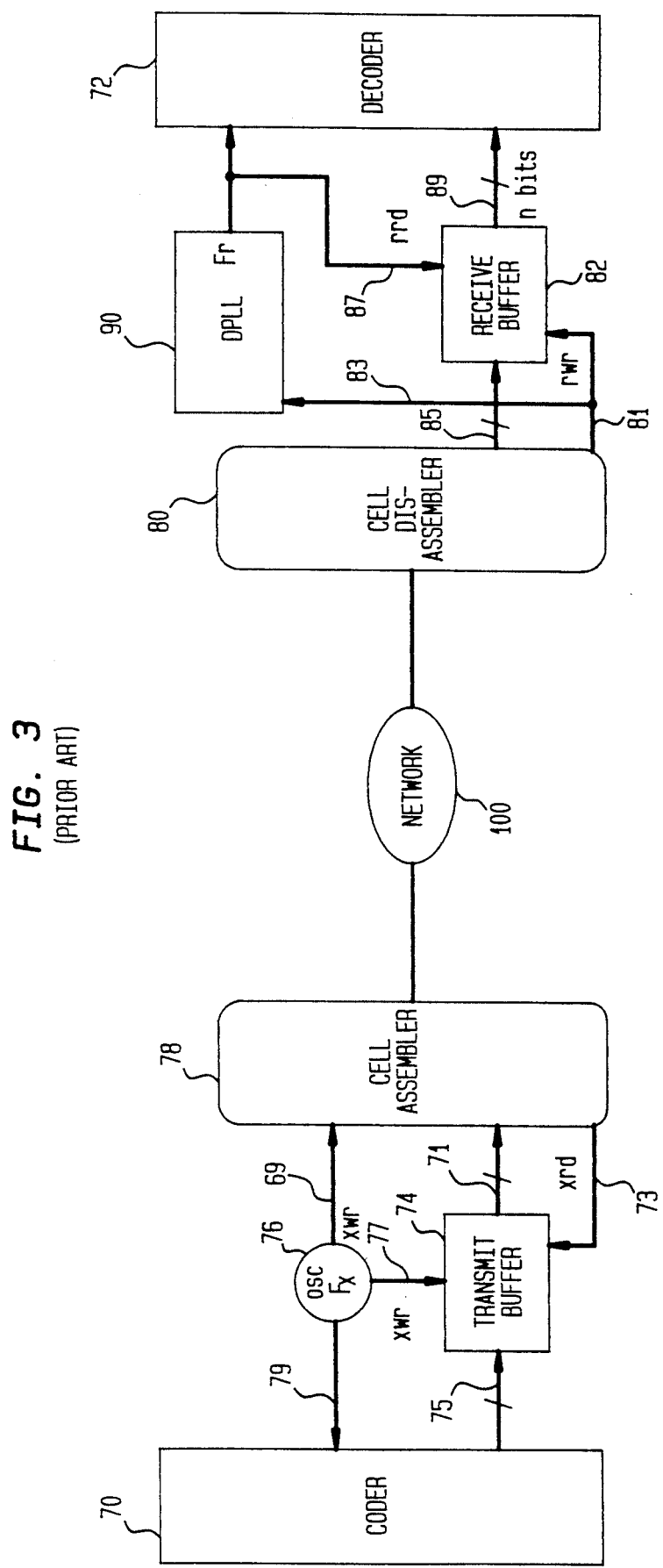
FIG. 3 schematically illustrates a prior art clock recovery scheme for a fixed bit rate service.

FIG. 3 illustrates a prior art clock recovery technique for use at a receiving unit of customer premises equipment when the transmitting unit of customer premises equipment has a fixed bit rate. Consider, for example, a unit of customer premises equipment such as the video coder 70. The video coder 70 wishes to transmit information via the trunk and exchange network 100 to the video decoder 72. Information from the video coder 70 is written via line 75 into the transmit-buffer 74 at a rate which is directly proportional to the frequency Fx of the service clock 76. In particular, the service clock 76 generates the write signal xwr on line 77 for the transmit-buffer 74. Illustratively, the video coder 70 serves to convert an analog video signal to digital form and codes this signal. In this case the service clock frequency Fx is the sampling frequency of the video coder and is transmitted to the video coder on line 79.

The cell assembler 78 receives the xwr signal on line 69 so that the cell assembler knows how many bytes of data are written into the transmit buffer 74. When there are sufficient data bytes in the transmit-buffer to form a cell, the cell assembler 78 generates a read signal xrd on line 73 to read the data out of the transmit-buffer 74 on line 71. A header is appended to the data to form a cell for transmission via the network 100 using the Asynchronous Transfer Mode.

At the receive-end, the cell disassembler 80 filters out cells received from the network 100 which are addressed to the video decoder 72 and strips off the cell headers. The cell disassembler 80 generates a write signal rwr on line 81 for the receive-buffer 82 and writes the data destined for the decoder 72 into the receive-buffer 82 via line 85.

A digital phase locked loop (DPLL) 90 is used to recover the transmit service clock Fx. The digital phase locked loop 90 receives the rwr signal from the cell disassembler via line 83 and generates the rrd signal on line 87 which reads data out of the buffer 82 on line 89 for transmission into the decoder 72. The role of the phase locked loop 90 is to cause Fr, the frequency of the rrd signal, to approach the transmit service clock frequency Fx as closely as possible. The phase loop 90 (which is discussed in detail in the above-identified U.S. patent application Ser. No. 07/429,840) comprises a phase detector (not shown) which monitors the occupancy of the buffer 82, a low pass filter (not shown), and a voltage controlled oscillator (not shown) which outputs the read signal rrd. The center frequency of the voltage controlled oscillator is chosen to be as close as possible to the nominal frequency of transmit service clock. The digital phase lock loop monitors the occupancy level of the buffer 82 and regulates rrd to maintain the occupancy level of the buffer 82 within a certain range.

The service clock recovery is achieved due to the fact that the rate at which information is written into the transmit-buffer 74 at the transmit-end is directly proportional to the service clock frequency Fx. Therefore, the transmit service clock can be recovered at the receive-end by averaging the rate at which information is read out of the receive-buffer 82 and transferred to the decoder 72. By averaging the rate at which information is read from the receive-buffer 82 Fr is made to approach Fx and the signal rrd at the receive-end is made to approach xwr at the transmit-end. Thus, the service clock frequency has been recovered at the receive-end.

As indicated above, the above-described clock recovery scheme is not applicable to a variable bit rate source.

Figure 4:
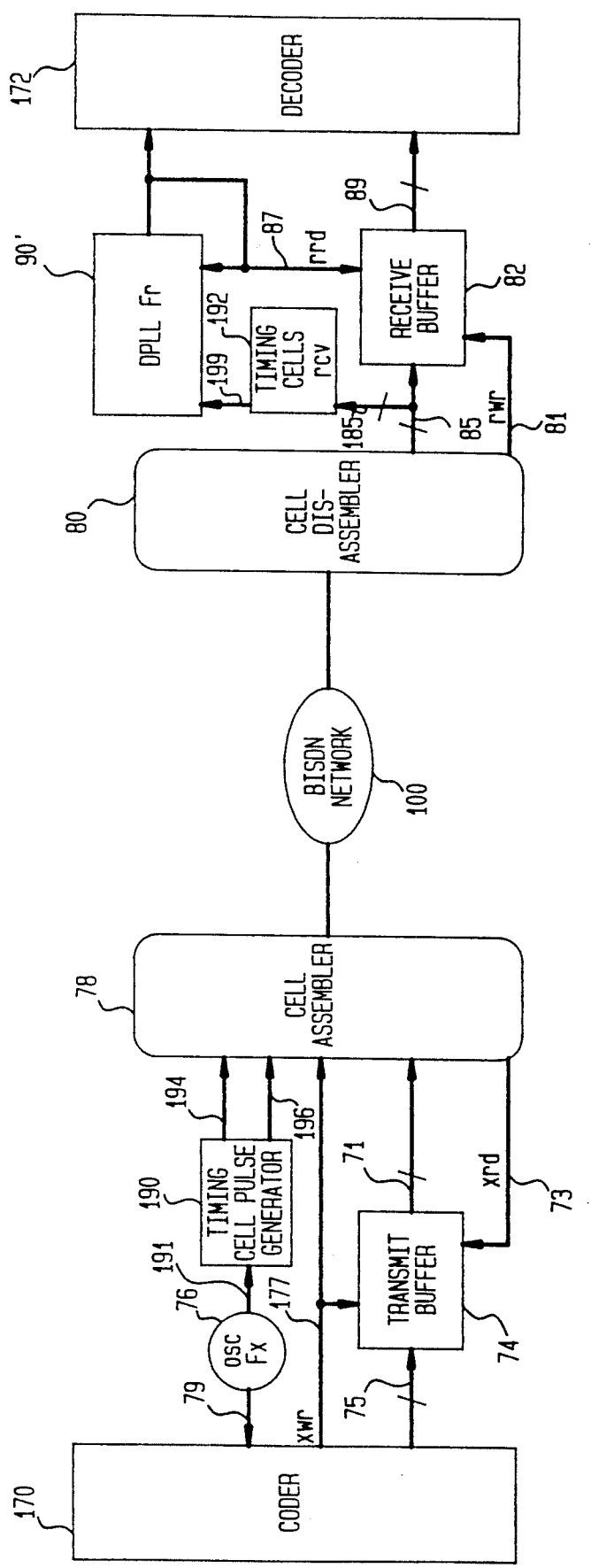
FIG. 4 schematically illustrates a clock recovery scheme for a variable bit rate service, in accordance with an illustrative embodiment of the present invention.

A clock recovery scheme for a variable bit rate source in accordance with the present invention is illustrated in FIG. 4. In FIG. 4, the variable bit rate coder 170 wishes to send information via the network 100 to the decoder 172.

The variable bit rate coder 170 makes uses of the service clock 76 of frequency Fx as a sampling clock. However, even though this sampling clock is of constant frequency, the rate at which information comes out of the coder 170 on line 75 is not directly proportional to this sampling frequency. Rather, information coming out of the variable bit rate coder 170 is a function of picture variations. Thus, if there are no changes between two consecutive picture frames, then no information is transmitted on line 75. Accordingly, the write signal xwr on line 177 for writing data into the transmit-buffer 74 is not periodic. Instead, this signal is random because it depends on random picture variations. The write signal xwr is derived by the decoder 170 from the clock signal produced by the clock 76 whenever valid data is to be written into the buffer 74. Thus the service clock signal is transmitted to the coder 170 on line 79. Data written into the transmit-buffer 74 is formatted into cells by the cell assembler 78 and inserted into an asynchronous transfer mode bit stream for transmission via the network 100.

In this case, in order to be able to recover the transmit service clock frequency Fx at the receive-end, a timing cell pulse generator 190 is utilized to generate a stream of timing cells at rate directly proportional to the transmit service clock frequency Fx. In particular, the timing cell pulse generator 190 generates pulses at a rate proportional to Fx to tell the cell assembler 78 when to generate timing cells. In response to these pulses, the cell assembler generates timing cells which along with the data cells are transmitted in the ATM bit stream to the receiver.

At the receive-end, the timing cells and data cells are received at the cell disassembler 80. The data from the data cells are written into the receive-buffer 82 via line 85 under the control of the rwr signal generated by the cell disassembler on line 81. Information from the timing cells is transmitted to the timing cells receive unit 192 via lines 185. The timing cells receive unit 192 generates a pulse which is transmitted on line 199 to the digital phase locked loop 90' every time a timing cell is received. The digital phase locked loop 90' generates a read signal rrd on line 87 at a frequency Fr which reads the received data out of the buffer 82 and transfers this data to the decoder 172 via line 89. The frequency Fr is generated by the phase locked loop 90' to be proportional to the average rate at which timing cells are received and thus proportional to the transmit-end service clock frequency Fx. In this manner the transmit-end service clock is recovered at the receive-end for a variable bit rate service.

Data and timing cells can be identified with different virtual circuit identifiers so that they can be separated at the cell disassembler 80. The timing cells should be generated to minimize the bandwidth they occupy while permitting correct clock recovery. It is expected that correct clock recovery can be achieved when the timing cells utilize only a fraction of the bandwidth utilized by the data cells.

Timing cells should be given a higher priority than data cells when transmitted via the network 100 in order to minimize clock recovery errors due to timing cell losses or delays. Illustratively, the timing cells can be tagged with numbers at the transmit-end, so that timing cell losses can be compensated at the receive-end.

Figure 5:
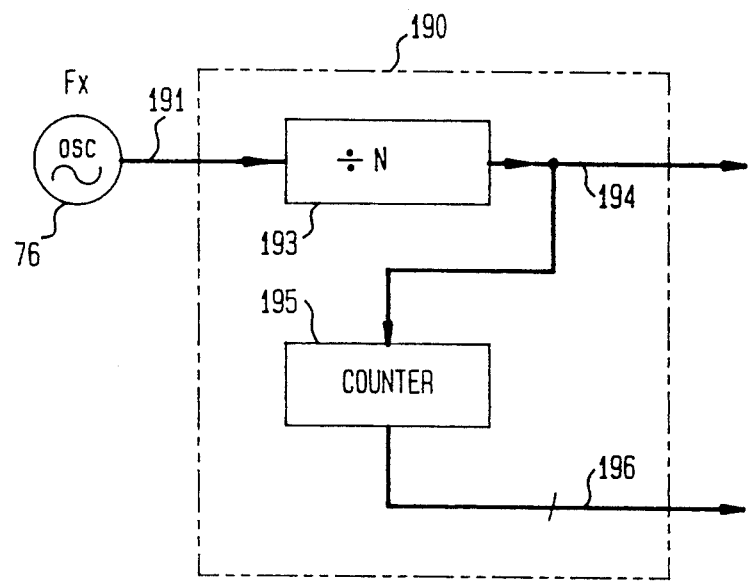
FIG. 5 illustrates a timing cell pulse generator for use in the clock recovery scheme of FIG. 4.

FIG. 5 shows the timing cell pulse generator 190 of FIG. 4 in greater detail. The purpose of the timing cell pulse generator 190 is to send a pulse to the cell assembler 78 for each timing cell to be generated. The input to the timing cell pulse generator on line 191 is the transmit-end service clock 76 of frequency Fx. The timing cell pulse generator 190 comprises a divide-by-N counter 193 which outputs one pulse for every N input pulses from the clock 76. The output pulses of the counter 193 are transmitted to the cell assembler 78 via line 194. The value of N is chosen in such a way to minimize bandwidth utilization by the timing cells while permitting correct clock recovery. The timing cell pulse generator optionally includes the counter 195, where m is the highest number of the counting cycle of the counter 195. The purpose of the counter 195 is to tag the timing cells with a number. The output of the counter 195 is transmitted to the cell assembler via line 196 to indicate the timing cell number. Cells will be numbered from zero to m.

Figure 6:
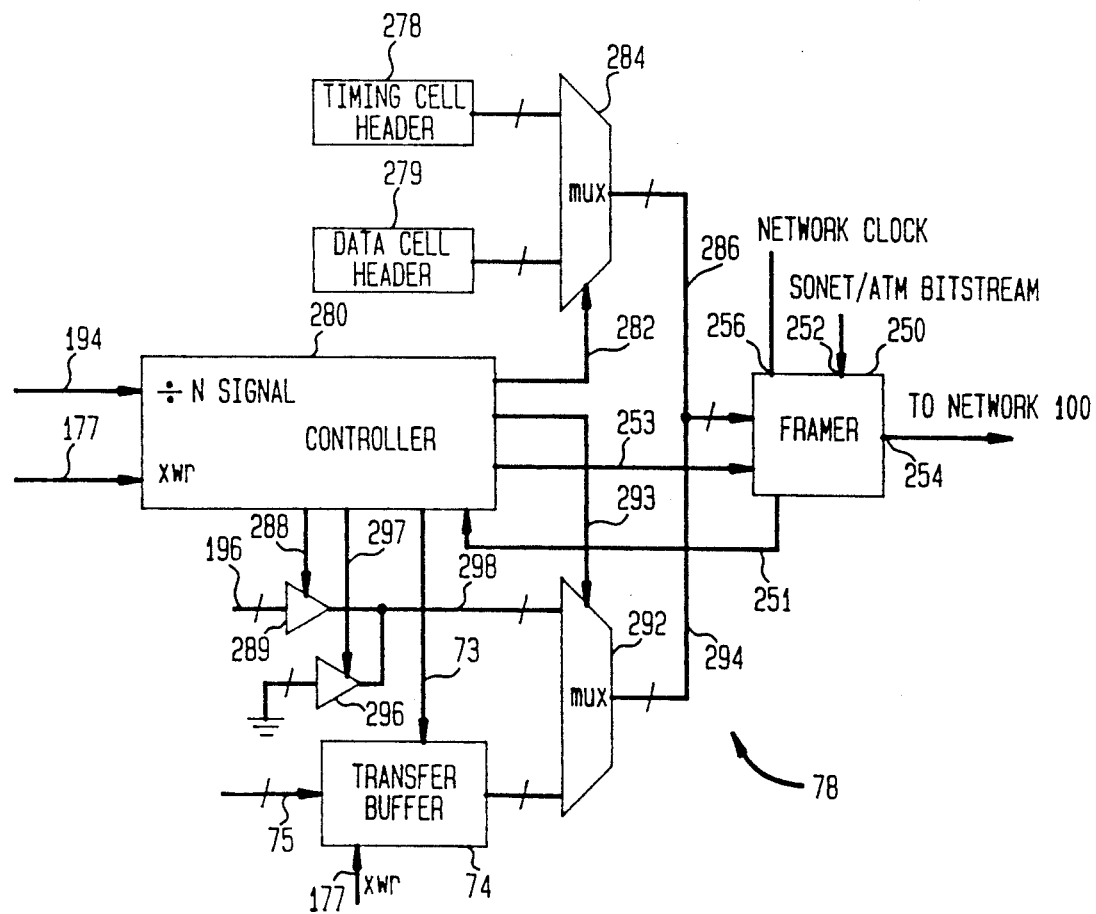
FIG. 6 illustrates a cell assembler for use in the clock recovery scheme of FIG. 4.

The cell assembler 78 is shown in greater detail in FIG. 6. The purpose of the cell assembler 78 is to combine a header (e.g. 5 bytes) and data (e.g. 48 bytes) to form a cell for insertion into an ATM bit stream. The cell assembler 78 comprises two registers 278 and 279. The register 278 contains a header for the timing cells. The header for the timing cells includes a first virtual circuit identifier which signifies a timing cell addressed to the decoder 172 (see FIG. 4). The register 279 contains a header for the data cells. The header for the data cells comprises a second virtual circuit identifier which signifies a data cell addressed to the decoder 172.

The data for the data cells is written into the transmit-buffer 74 via line 75 from the variable bit rate coder. The buffer 74 also receives the xwr signal from the coder via line 177. The cell assembler 78 also receives via line 196 the tag value for a timing cell from the counter 195 of FIG. 5.

The cell assembler 78 includes a framer 250. The framer is described in detail in U.S. Pat. No. 4,819,226. The purpose of the framer 250 is to insert cells into an ATM bit stream of the network 100 which illustratively uses SONET frames. Thus, the framer 250 receives an ATM/SONET bit stream at input 252 from the network 100 and outputs the ATM/SONET bit stream to the network 100 at the output 254. The framer 250 also receives the network clock at the input 256.

The cell assembler 78 also includes a controller 280. The controller 280 receives via line 194 the output signal of the divide-by-N counter 193 of FIG. 5 and the xwr signal via line 177.

The controller 280 counts the number of data bytes written into the transmit-buffer 74 and causes a data cell to be generated whenever a sufficient number of bytes (e.g. 48 bytes) is written into the transmit buffer. Similarly, the controller 280 causes a timing cell to be generated for each pulse received on line 194 from the timing cell pulse generator. The controller 280 also receives a delineation control signal from the framer 250 on line 251 which indicates where cells are to be inserted in the ATM bit stream. If a timing cell is to be transmitted, the controller will enable a "cell insert" signal on line 253 to the framer. In addition, a timing cell is assembled, which timing cell comprises a header (5 bytes) and data (48 bytes). An enable signal on line 282 causes the multiplexer 284 to transmit the timing cell header from the register 278 to the framer on line 286. An enable signal on line 288 opens the tristate device 289 and a tag value is transmitted to the frame 250 via line 298, via the multiplexer 292 and line 294. The multiplexer 292 is enabled via line 293. Since the tag value is only one byte and an ATM cell has an information field comprising 48 bytes, the remainder of the information field of the timing cell is filled for example with "zero" bytes. The zero bytes are generated by enabling the tristate device 296 via line 297. The zero bytes are then transmitted to the framer 250 via line 298, via the multiplexer 292 and line 294.

Similarly, if a data cell is to be transmitted, the data cell header from the register 279 is transmitted via the multiplexer 284 and line 286 to the framer 250. Similarly, the controller 280 generates the xrd signal on line 73 to cause forty-eight bytes of data to be transmitted via the multiplexer 292 and line 294 to the framer 250 for insertion in the ATM bit stream.

Figure 7:
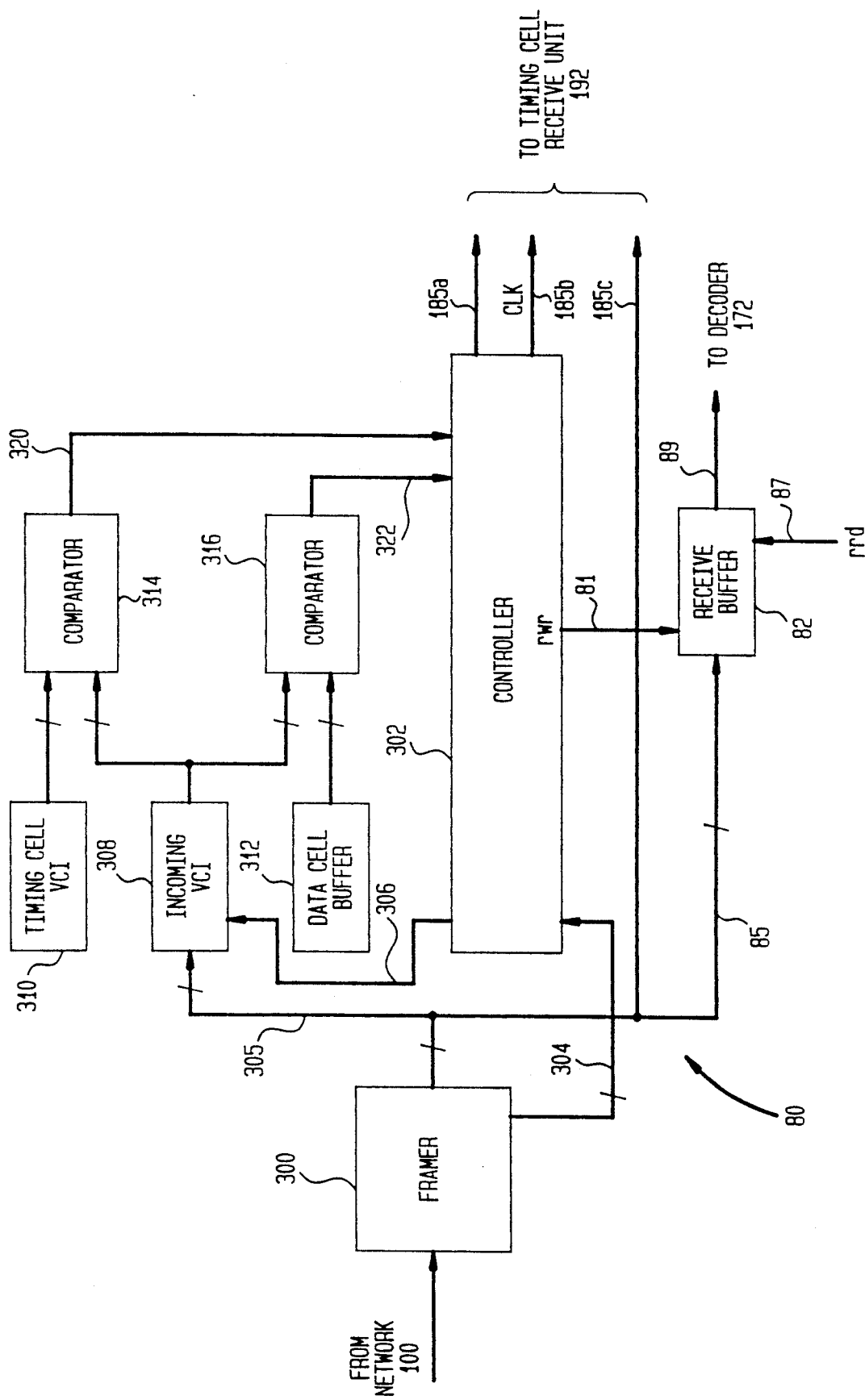
FIG. 7 illustrates a cell disassembler for use in the clock recovery scheme of FIG. 4.

The cell disassembler 80 of FIG. 4 is shown in greater detail in FIG. 7. An ATM/SONET bit stream is received from the network 100 (see FIG. 4) at the framer 300. The framer 300 transmits a delineation control signal to the controller 302 via line 304 to indicate the position of incoming cells of the ATM bit stream in the framer 300.

A strobe signal from the controller on line 306 causes the portion of the header of each arriving cell which contains the virtual circuit identifier (VCI) to be latched into the incoming VCI register 308 via line 305. The predetermined virtual circuit identifier for a timing cell addressed to the decoder 172 (see FIG. 4) is stored in the register 310. The predetermined virtual circuit identifier for a data cell addressed to the decoder 172 is stored in the register 312. The comparator circuit 314 compares the predetermined timing cell virtual circuit identifier in the register 310 with the incoming virtual circuit identifier in the register 308. Similarly, the comparator circuit 316 compares the predetermined data cell virtual circuit identifier in the register 312 with the incoming virtual circuit identifier in register 308. If the comparator 314 or the comparator 316 finds a match, a signal is sent to the controller 302 on line 320 or line 322.

If an incoming cell is identified as a data cell in the foregoing manner, the controller 302 transmits the rwr write signal via line 81 to the receive-buffer 82 to write the data from the data cell into the receive-buffer 82 via line 85. In response to the rrd read signal on line 87, the data is eventually transferred to the decoder 172 via line 89.

If an incoming cell is identified as a timing cell, the controller 302 sends an announce signal on line 185a to the timing cell receive unit 192 (see FIG. 4) to indicate the presence of a timing cell. The controller 302 also sends to the timing cell receive unit a delineation control signal CLK on line 185b. In addition, the tag value in the timing cell is sent to the timing cell receive unit via a line 185c.

Figure 8:
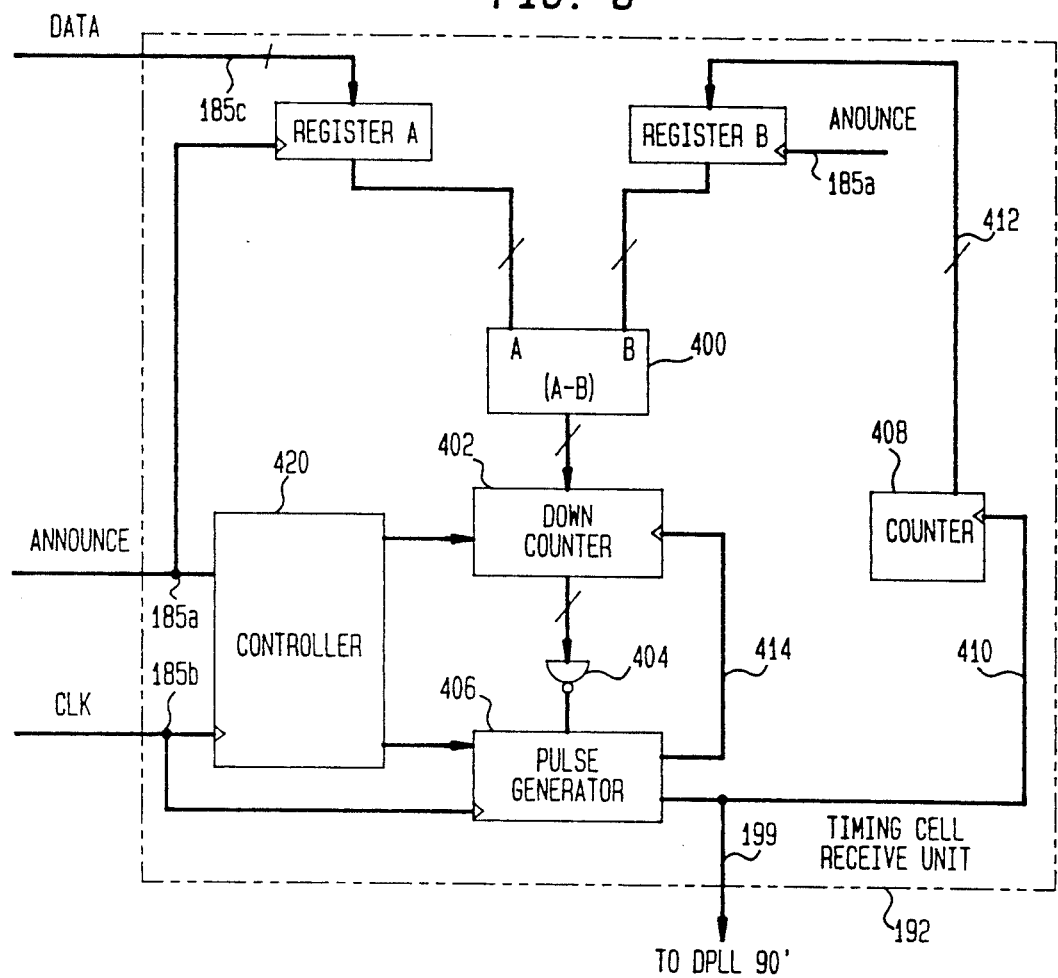
FIG. 8 illustrates a timing cell receive unit for use in the clock recovery scheme of FIG. 4.

The timing cell receive unit 192 (see FIG. 4) is illustrated in greater detail in FIG. 8. As indicated previously the purpose of the timing cell receive unit is to transmit pulses to the digital phase locked loop 90' in response to timing cells and to correct for missing timing cells. The register A stores the tag of an incoming timing cell. This tag is received from the cell disassembler via line 185c. The register B stores the tag value that is expected to arrive and is initially set to the value zero. A subtractor circuit 400 subtracts B (the value stored in register B) from A (the value stored in register A) and enters the result in the down-counter 402. The output of the down-counter 402 is entered into a zero detector in the form of nand-gate 404. The output of the nand-gate 404 is transmitted to a pulse generator 406. When the value in the counter 402 is zero, the pulse generator 406 generates a pulse on line 199, which pulse is transmitted to the digital phase locked loop 90' (see FIG. 4). This pulse is also transmitted to the counter 408 via line 410 to increase the value in the counter 408 by one count so as to communicate via line 412 to the register B the tag value of the next expected timing cell. The highest value in the counting cycle of the counter 408 is m. When a value different from zero is detected by the gate 404, this means that timing cells have been lost. In this case the pulse generator 406 generates pulses for the digital phase locked loop to indicate the number of lost timing cells and for updating the 408. The pulse generator 406 also generates pulses on line 414 to decrease the value of the counter 402 until a zero value is obtained to compensate for any lost timing cells. The pulse generator 406 and the counter 402 are controlled by a controller unit 420 whose inputs are the announce signal received from the cell disassembler on line 185a and the delineation control signal received from the cell disassembler on line 185b.

Figure 9:
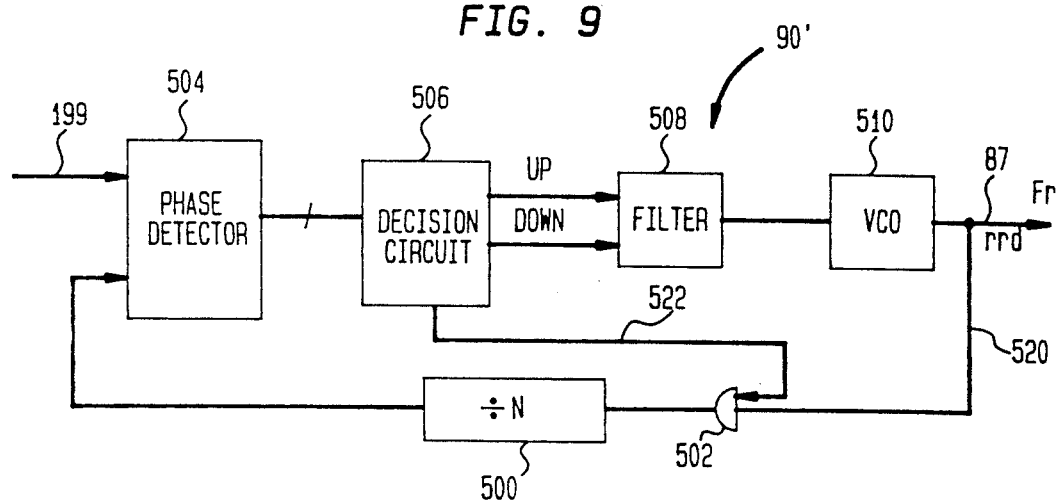
FIG. 9 illustrates a digital phase locked loop for use in the clock recovery scheme of FIG. 4.

A digital phase locked loop 90' for use in the inventive clock recovery scheme is illustrated in FIG. 9. The digital phase locked loop receives the pulses from the pulse generator of the timing cell receive unit on line 199, averages the rate of arrival of these pulses and generates the rrd signal on line 87 to control the reading of data out of the receive-buffer 82 (see FIG. 4). The rrd signal is generated by the voltage controlled oscillator (VC)) 510. The rrd signal has a frequency Fr which approaches the frequency Fx of the service clock at the transmit-end.

The output signal rrd of the phase detector is also fed on line 520 to a divide-by-N counter 500. The transmission of the recovered clock signal rrd to the divide-by-N counter 500 is enabled by the gate 502 whenever the decision circuit 506 indicates via a signal on line 522 that a threshold number of a pulses on line 199 has been received. The divide-by-N counter 500 divides the number of pulses in the recovered clock signal rrd by N. Thus, the counter 500 is the counterpart to the divide-by-N counter 193 in the timing cell transmit unit 190 of FIG. 5. The phase detector 504 counts the number of timing cells received and the number of pulses in the recovered clock after division by N and monitors the difference between these two counts. If the difference between the two counters is outside a certain range, the decision circuit 506 outputs an up-signal or a down-signal to increase or to decrease the output frequency of the voltage controlled oscillator 510. The up-signal and down-signal are converted to a control voltage for the voltage controlled oscillator by the filter 508.

In short, a scheme is disclosed for recovering the service clock of a variable bit rate source which generates data at a rate which is not proportional to the service clock. To recover the service clock at a remote receiver, at the transmitter, timing cells are generated at a rate which is proportional to the service clock. The timing cells and data are transmitted via a network to the receiver. At the receiver the data is stored in a receive-buffer. A digital phase locked loop at the receiver generates a local clock signal in the form of a read signal for reading the received data out of the receive-buffer. The read signal generated by the phase locked loop is proportional to the average rate at which timing cells are received at the receiver. In this manner the signal which reads the data out of the buffer at the receiver approaches the service clock at the transmit-end.

Finally, the above-described embodiments of the invention are intended to be illustrative only. Numerous alternative embodiments may be devised by those skilled in the art without departing from the spirit and scope of the following claims.

We claim:

1. A method of operating a communications system including a transmitter and a receiver to recover at the receiver the service clock signal of a variable bit rate source from a bit stream generated at the transmitter and received at the receiver, said method comprising the steps of:
    at the transmitter, generating data at a rate which is not proportional to a service clock signal at the transmitter and organizing said data into data cells,
    generating timing cells at a rate proportional to the service clock signal at the transmitter, and
    combining said data cells and said timing cells in the bit stream; and
    at the receiver, receiving the data cells and timing cells in the bit stream,
    averaging the rate at which the timing cells arrive at the receiver, and
    generating a local clock signal at the receiver derived from and proportional to the average rate of the timing cells at the receiver so that the local clock signal is proportional to the service clock signal at the transmitter.

2. The method of claim 1 wherein said step of receiving said data cells and said timing cells at said receiver further comprises the step of storing the data contained in said data cells in a buffer.

3. The method of claim 2 wherein said local clock signal controls the rate at which data is read out of said buffer.

4. The method of claim 3 wherein said local clock signal is generated by a digital phase locked loop.

5. The method of claim 1 wherein said data cells and said timing cells are transmitted from said source to said receiver by embedding said data and timing cells in an Asynchronous Transfer Mode bit stream.

6. The method of claim 1 wherein said data is generated at said source be a variable bit rate video coder which generates data at a rate depending on picture variations.

7. The method of claim 1 further comprising at the transmitter, the step of tagging the timing cells with a number to reflect the order in which the timing cells are transmitted.

8. The method of claim 7 further comprising the step of utilizing said number in said timing cells to indicate missing timing cells at said receiver.

9. A transmitter for transmitting data from a variable bit rate data source when the data generated at said source is at a rate not proportional to a service clock, comprising
   means for generating a service clock,
   a buffer for storing said variable bit rate data from said source,
   means for generating timing cells at a rate proportional to said service clock, and
   means for embedding said timing cells and said data stored in said buffer into a bit stream for transmission to a receiver.

10. The transmitter of claim 9 wherein said transmitter further includes means for generating data cells from said data stored in said buffer.

11. The transmitter of claim 10 wherein said data cells and said timing cells are embedded by said embedding means in an Asynchronous Transfer Mode bit stream.

12. A transmitter for transmitting data from a variable bit rate data source when the data generated at said source is at a rate not proportional to a service clock, comprising
   means for generating a service clock,
   a buffer for storing said variable bit rate data from said source,
   means for generating timing cells at a rate proportional to said service clock,
   means for tagging sad timing cells with numbers to reflect the order in which said timing cells are transmitted, and
   means for embedding said timing cells and said data stored in said buffer into a bit stream for transmission to a receiver.

13. A receiver for recovering at a destination location the service clock of an originating location variable bit rate source from timing cells received, comprising
   a buffer for receiving variable bit rate data transmitted by said variable bit rate source to said receiver via a network,
   means for separating said timing cells from said data received at said receiver and transmitted via said network, and
   a phase locked loop responsive to said timing cells for reading said data out of said buffer at rate which is proportional to the originating location service clock.

14. The receiver of claim 13 wherein said data received via said network is received in data cells and said receiver includes a cell disassembler for disassembling said data cells before storing said data in said buffer.

15. The receiver of claim 14 wherein said data cells and said timing cells are received at said receiver in an Asynchronous Transfer Mode bit stream.

16. A receiver for recovering at a destination location the service clock of an originating location variable bit rate source from timing cells received, comprising
   a buffer for storing variable bit rate data transmitted by said variable bit rate source to said receiver via a network,
   means for indicating the arrival at said receiver of numbered timing cells generated at said source at a rate proportional to said service clock and transmitted via said network,
   means responsive to timing cell numbers to correct for missing timing cells, and
   a phase locked loop responsive to said timing cells for reading said data out of said buffer at a rate which is proportional to said service clock.

* * * * *